United States Patent
Frederick et al.

(10) Patent No.: US 10,207,667 B2
(45) Date of Patent: Feb. 19, 2019

(54) BUMPER ASSEMBLIES FOR VEHICLES INCLUDING LOW-ENERGY IMPACT INDICATORS

(71) Applicant: TOYOTA MOTOR ENGINEERING & MANUFACTURING NORTH AMERICA, INC., Erlanger, KY (US)

(72) Inventors: Scott L. Frederick, Brighton, MI (US); Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 116 days.

(21) Appl. No.: 15/397,168

(22) Filed: Jan. 3, 2017

(65) Prior Publication Data

US 2018/0186318 A1 Jul. 5, 2018

(51) Int. Cl.
*B60R 19/38* (2006.01)
*B60Q 9/00* (2006.01)

(52) U.S. Cl.
CPC .............. *B60R 19/38* (2013.01); *B60Q 9/00* (2013.01)

(58) Field of Classification Search
CPC .................................. B60R 19/38; B60Q 9/00
USPC ............................................ 293/102, 117, 133
See application file for complete search history.

(56) References Cited

U.S. PATENT DOCUMENTS

| 3,880,455 A | 4/1975 | Toemmeraas | |
|---|---|---|---|
| 6,302,458 B1 * | 10/2001 | Wang | B60R 19/40 |
| | | | 293/119 |
| 6,764,116 B2 | 7/2004 | Ledford et al. | |
| 7,036,844 B2 * | 5/2006 | Hammer | B60R 19/205 |
| | | | 280/729 |
| 7,210,718 B1 * | 5/2007 | Budhu | B60R 19/38 |
| | | | 293/114 |
| 2006/0017295 A1 * | 1/2006 | Danisch | B60R 21/0136 |
| | | | 293/120 |
| 2011/0042975 A1 * | 2/2011 | Faruque | B60R 19/28 |
| | | | 293/118 |
| 2014/0379223 A1 * | 12/2014 | Wolkenstein | B60R 19/34 |
| | | | 701/45 |

FOREIGN PATENT DOCUMENTS

| CN | 202879405 U | 4/2013 |
|---|---|---|
| GB | 2525987 A | 11/2015 |
| JP | 4941773 B2 | 5/2012 |

* cited by examiner

*Primary Examiner* — Jason S Morrow
*Assistant Examiner* — E Turner Hicks
(74) *Attorney, Agent, or Firm* — Dinsmore & Shohl LLP (57) ABSTRACT

A vehicle includes a vehicle body having a front and a rear. A vehicle rear bumper assembly is located at the rear of the vehicle body. The vehicle rear bumper assembly includes a bumper beam reinforcement member having an upper part, a lower part and a rearward most part extending between the upper part and the lower part. A bumper cover extends over the upper part. A mechanical extending component is located in the bumper reinforcement member. The mechanical extending component has a retracted configuration located below the bumper cover and an extended configuration where the mechanical extending component penetrates through the bumper cover in response to a low-energy impact to the rearward most part of the bumper beam reinforcement member.

20 Claims, 5 Drawing Sheets

BUMPER ASSEMBLIES FOR VEHICLES INCLUDING LOW-ENERGY IMPACT INDICATORS

TECHNICAL FIELD

The present specification generally relates to bumper assemblies for vehicles and, more specifically, to bumper assemblies for vehicles that include low-energy impact indicators.

BACKGROUND

Bumper assemblies, particularly rear bumper assemblies, may be used for more than their impact characteristics. For example, users may utilize bumper assemblies to sit or lean on or place objects on while outside the vehicle. For many truck owners, the rear bumper may provide a step as a rest for a foot of the user when ascending to or descending from a truck bed of the truck. In these cases, the rear bumper may experience a substantial vertical load due to the user's weight and any objects carried by the user onto the truck bed.

It is not unusual for bumper assemblies to experience low-energy impacts, which may not appear visually to affect structures of the bumper assemblies. However, some low-energy impacts may reduce the structural integrity of the bumper structures, with little to no outside visual indication. Accordingly, a need exists for bumper assemblies that include low-energy impact indicators.

SUMMARY

In one embodiment, a vehicle includes a vehicle body having a front and a rear. A vehicle rear bumper assembly is located at the rear of the vehicle body. The vehicle rear bumper assembly includes a bumper beam reinforcement member having an upper part, a lower part and a rearward most part extending between the upper part and the lower part. A bumper cover extends over the upper part. A mechanical extending component is located in the bumper reinforcement member. The mechanical extending component has a retracted configuration located below the bumper cover and an extended configuration where the mechanical extending component penetrates through the bumper cover in response to a low-energy impact to the rearward most part of the bumper beam reinforcement member.

In another embodiment, a vehicle rear bumper assembly includes a bumper beam reinforcement member having an upper part, a lower part and a rearward most part extending between the upper part and the lower part. A bumper cover extends over the upper part. A mechanical extending component is located in the bumper reinforcement member. The mechanical extending component has a retracted configuration located below the bumper cover and an extended configuration where the mechanical extending component penetrates through the bumper cover in response to a low-energy impact to the rearward most part of the bumper beam reinforcement member.

In another embodiment, a method of providing an indication to a vehicle user that a vehicle rear bumper assembly has experienced a low-energy rear impact is provided. The method includes engaging an impact barrier with a vehicle rear bumper assembly. The vehicle rear bumper assembly includes a bumper beam reinforcement member having an upper part, a lower part and a rearward most part extending between the upper part and the lower part. A bumper cover extends over the upper part. A mechanical extending component is located in the bumper reinforcement member. The mechanical extending component has a retracted configuration located below the bumper cover and an extended configuration where the mechanical extending component penetrates through the bumper cover. The mechanical extending component is moved to the extended configuration in response to a low-energy impact during the step of engaging the impact barrier.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles and bumper assemblies that include low-energy impact indicators. The low-energy impact indicators may ordinarily be hidden within the bumper of the bumper assemblies, behind a bumper fascia and below a bumper cover. The low-energy impact indicator may include a mechanical extending component that is located within the bumper. In a retracted configuration, the mechanical extending component remains hidden with the bumper and remains hidden under normal operation conditions. Upon a sufficient low-energy impact to the bumper, the mechanical extending component may extend outward and pierce the bumper cover and/or bumper fascia in an extended configuration to expose a head portion of the mechanical extending component. The head portion of the mechanical extending component may remain exposed in the extended configuration to provide an indication that the bumper assembly may be structurally compromised to some degree. This indication can provide an opportunity for the vehicle user to service the bumper assembly, even with little or no visible indication other than the exposure of the mechanical extending component.

Figure 1:
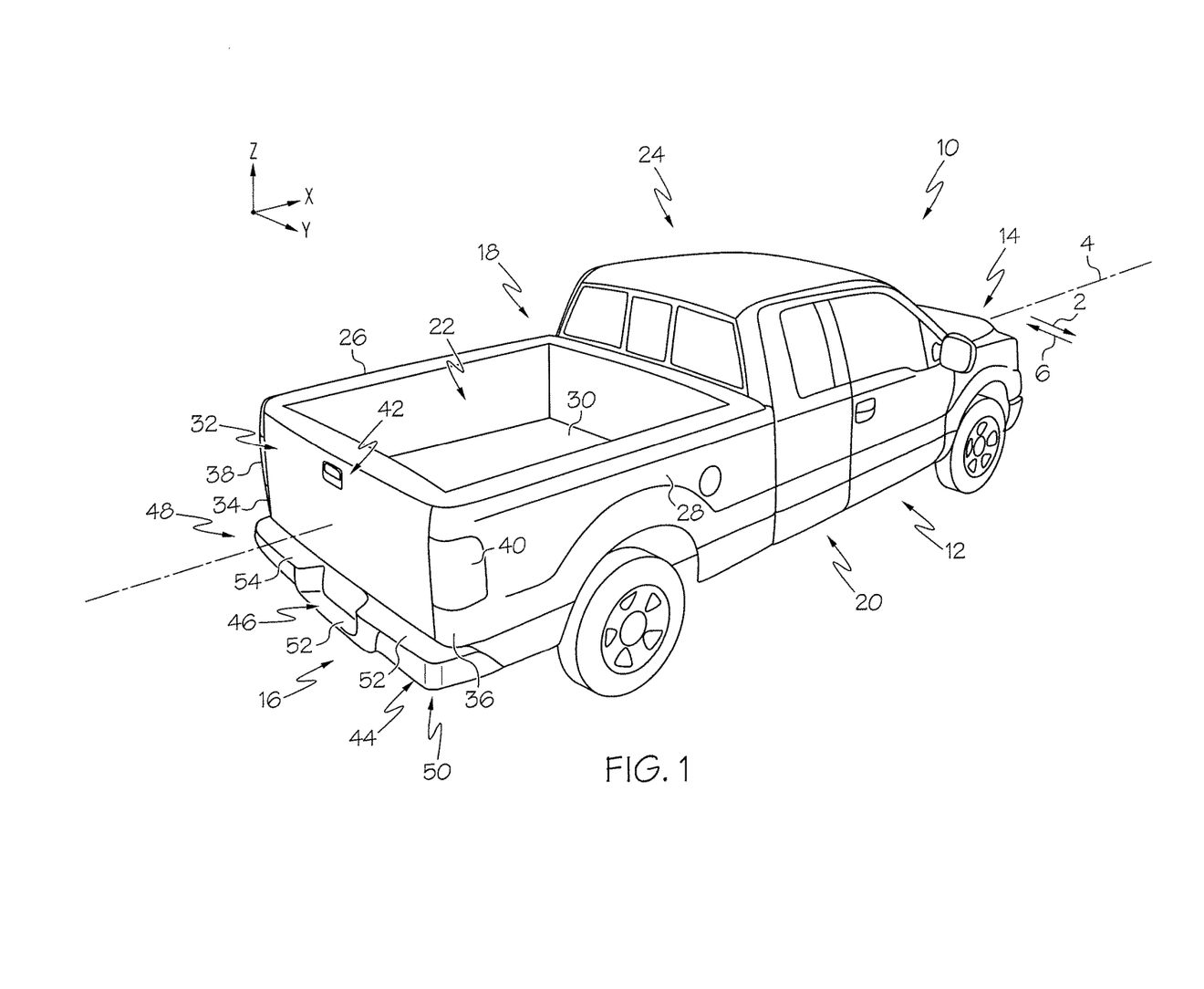
FIG. 1 depicts a perspective view of a vehicle, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring to FIG. 1, the vehicle 10 includes a vehicle body 12 having a front 14, a rear 16 and sides 18 and 20 that extend between the front 14 and the rear 16 in the vehicle longitudinal direction. In the illustrated embodiment, the vehicle 10 is a truck including a cargo area 22 that is formed rearward of a cabin area 24 by sidewalls 26 and 28, floor 30 and a tailgate assembly 32 that is located between tailgate posts 34 and 36. The tailgate posts 34 and 36 may include taillights 38 and 40 and latch components (e.g., strikers) that can releasably connect to the tailgate assembly 32 for releasably latching the tailgate assembly 32 in a raised configuration, as shown. The tailgate assembly 32 may include a tailgate handle assembly 42 that can be used to release the tailgate assembly 32 from the latch components in order to place the tailgate assembly 32 in a lowered position. In the lowered position, the floor 30 may be extended outward beyond a vehicle rear bumper assembly 44 and increased access to the cargo area 22 can be provided. In some embodiments, the tailgate assembly 32 may be removable from the cargo area 22.

The vehicle rear bumper assembly 44 is located below the tailgate assembly 32 and extends rearward from the tailgate assembly 32 in the vehicle longitudinal direction. The vehicle rear bumper assembly 44 has a step portion 46 located in a center of the vehicle rear bumper assembly 44 and side portions 48 and 50 located at opposite sides of the step portion 46. The step portion 46 may be a recessed portion having an upper surface 52 that is recessed generally below upper surfaces 54 and 56 of the side portions 48 and 50. Such a recessed arrangement for the step portion 46 can provide a lowered step area that is closer to the ground than at the side portions 48 and 50. In other embodiments, the upper surfaces may be of a substantially constant elevation or other suitable configurations, such as multiple step portions.

Figure 2:
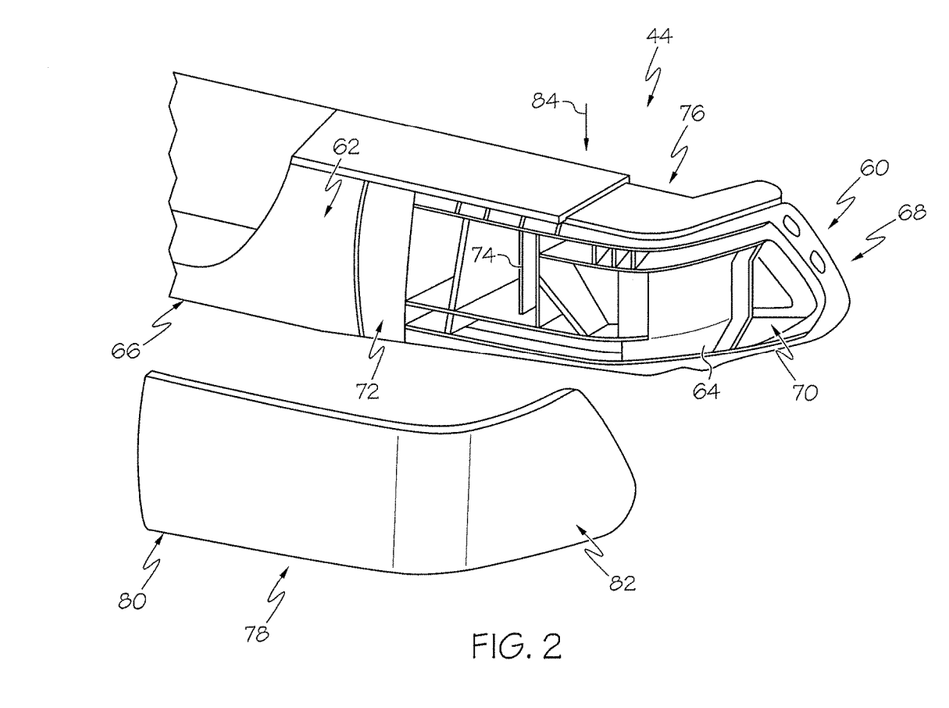
FIG. 2 depicts a perspective view of a vehicle rear bumper assembly of the vehicle of FIG. 1 in isolation, according to one or more embodiments shown and described herein.

Referring to FIG. 2, the vehicle rear bumper assembly 44 is illustrated in isolation and includes a bumper beam reinforcement member 60 that is covered by a rear bumper fascia 62. The rear bumper fascia 62 extends generally over a width of the bumper beam reinforcement member 60 in the vehicle lateral direction. The bumper beam reinforcement member 60 may be beam-shaped having a bumper reinforcement body 64 having a rear portion 66 that extends in the vehicle lateral direction and side portions 68 that extend in the vehicle longitudinal direction forming a somewhat U-shaped bumper reinforcement body 64. In the illustrated embodiment, the bumper reinforcement body 64 is generally formed of a plastic material. Suitable plastic materials for the bumper reinforcement body 64 and the rear bumper fascia 62 may include thermoplastic olefins, polycarbonates, polyesters, polypropylene, polyurethanes, polyamides, or combinations thereof with, for instance, glass fibers, for strength and structural rigidity.

The bumper beam reinforcement member 60 including the bumper reinforcement body 64 may be a unitary molded, monolithic bumper reinforcement body 64 formed of multiple portions including end portions 70 and central portion 72. In the illustrated example, the end portion 70 may be formed of multiple webs 74 that can extend in the vehicle vertical, lateral and longitudinal directions that form a somewhat honeycomb structure that provides reinforcement at the end portion 70. The central portion 72 may be formed of a solid structure that provides reinforcement at the central portion 72. Located above and covering the bumper reinforcement body 64 is a bumper cover 76. The bumper cover 76 may be part of the rear bumper fascia 62 or may be a separate component located below or underneath the rear bumper fascia 62. In either instance, the bumper cover 76 may be considered a component of the bumper fascia 62.

The bumper beam reinforcement member 60 may be covered at the end portion 70 by an outer bumper reinforcement cover 78. The outer bumper reinforcement cover 78 may be formed separately from the rear bumper fascia 62 and attached thereto, or the outer bumper reinforcement cover 78 may be an integral part and formed with the rear bumper fascia 62. In either instance, the outer bumper reinforcement cover 78 may be considered a component of the bumper fascia 62. The outer bumper reinforcement cover 78 may include a rear portion 80 and a side portion 82. The rear portion 80 may extend in the vehicle lateral direction and the side portion 82 may extend in the vehicle longitudinal direction to generally cover the end portion 70 of the bumper reinforcement body 64.

Upon a low-energy impact to the vehicle rear bumper assembly 44, it may be possible to affect the structural integrity of the bumper beam reinforcement member 60. Such a low-energy impact to the vehicle rear bumper assembly 44 may have minimal effect on the rear impact characteristics of the vehicle rear bumper assembly 44, if at all, and may not be readily discernible visually that any impact occurred. However, low-energy impacts to the vehicle rear bumper assembly 44 may reduce the structural integrity of the bumper beam reinforcement member 60 depending on the characteristics of the low-energy impact. For example, the low-energy impact or multiple low-energy impacts over time may rupture one or more of the webs 74 of the end portion 70 of the bumper reinforcement body 64. These low-energy impacts may reduce the structural integrity of the vehicle rear bumper assembly 44 in the vehicle vertical direction. As discussed above, users may utilize the vehicle rear bumper assembly 44 for more than impact characteristics, such as a step for climbing into the cargo area 22 or for placing a heavy object for loading into the cargo area 22. These activities can place a substantially vertical load on the vehicle rear bumper assembly 44 as represented by arrow 84.

Figure 3:
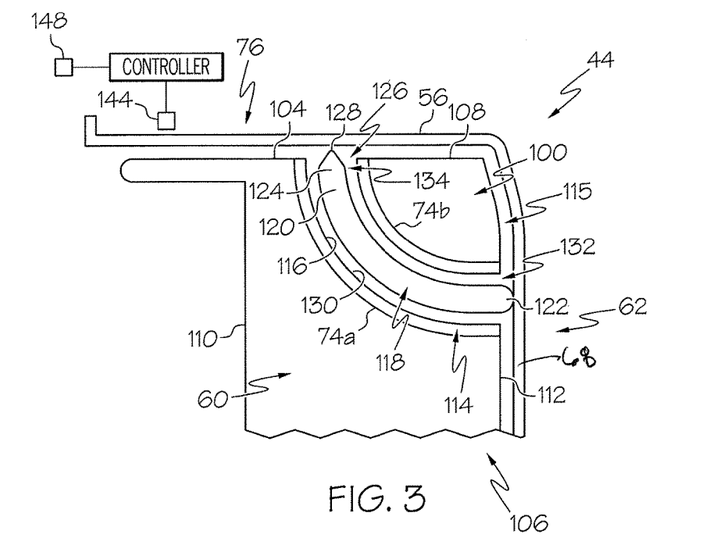
FIG. 3 depicts a diagrammatic, side section view of the vehicle rear bumper assembly of FIG. 2 including a low-energy impact indicator, according to one or more embodiments shown and described herein.

Referring to FIG. 3, the vehicle rear bumper assembly 44 is provided with a low-energy impact indicator 100. The vehicle rear bumper assembly 44 includes the bumper beam reinforcement member 60 and the rear bumper fascia 62 that extends over the bumper beam reinforcement member 60. The bumper cover 76, which may be a separate component or part of the bumper fascia 62 provides the upper surface 56 of the vehicle rear bumper assembly 44 that can be seen from outside the vehicle 10 and may be used as a load bearing surface, as described above. Beneath the bumper cover 76 is the bumper beam reinforcement member 60. The bumper beam reinforcement member 60 may include an upper part 104 and a lower part 106 (FIG. 2). The upper part 104 may provide an outermost surface 108 upon which the bumper cover 76 rests under ordinary operating conditions. The bumper beam reinforcement member 60 may also include a forward most part 110 and a rearward most part 112. The forward most part 110 may be nearest the tailgate assembly 32 (FIG. 1) and the rearward most part 112 may be covered by the bumper fascia 62. In some embodiments, a space 115 may be provided between the rearward most part 112 of the bumper beam reinforcement member 60 and the bumper fascia 62. Such an arrangement can provide a gap that can be traversed between the bumper fascia 62 and the bumper beam reinforcement member 60 before the bumper fascia 62 contacts the rearward most part 112 under a low-energy impact condition.

As described above, the bumper reinforcement body 64 may include a number of webs 74 that extend though the bumper reinforcement body 64. In the illustrated example, the bumper reinforcement body 64 includes webs 74a and 74b, which may be referred to a guide webs. The guide web 74a extends from the rearward most part 112 of the bumper reinforcement body 64 to the outermost surface 108. Likewise, the guide web 74b extends from the rearward most part 112 to the outermost surface 108. In some embodiments, the guide webs 74a and 74b may extend outwardly from the bumper fascia 62 (or outer bumper reinforcement cover 78). The guide web 74a and the guide web 74b may be spaced-apart from each other to form a guide channel 114 therebetween. While separate guide webs 74a and 74b are illustrated, the guide webs 74a and 74b may be a continuous guide web, such as forming a tube that extends from the rearward most part 112 to the outermost surface 108. The guide channel 114 extends generally from the rearward most part 112 of the bumper reinforcement body 64 to the outermost surface 108, thereby defining an arcuate guide channel 114 that extends continuously from the rearward most part 112 to the outermost surface 108. As will be discussed below, the guide channel 114 provides a guide track 116 along which a mechanical extending component 118 can follow during a predetermined low-energy impact condition.

The mechanical extending component 118 is positioned within the guide channel 114. The mechanical extending component 118 includes a component body 120 having a rearward most end 122 that is located nearest the rearward most part 112 of the bumper reinforcement body 64 and a forward most end 124 that is located nearest the outermost surface 108. In some embodiments, the rearward most end 122 may be rounded as illustrated; however, in other embodiments the rearward most end 122 may be squared. The forward most end 124 may be pointed having a tapered portion 126 that ends at an apex 128. The component body 120 may be generally rounded or rod-shape and extend between the forward most end 124 and the rearward most end 122. The component body 120 may be curved, at least on an inner side 130 that corresponds to or matches a radius of curvature of the guide track 116 provided by the guide channel 114 and the guide web 74a. The component body 120 may be formed from any suitable relatively hard material, such as hard plastic materials and/or metal.

FIG. 3 illustrates the mechanical extending component 118 in a retracted configuration where the forward most end 124 is recessed into the guide channel 114, beneath the bumper cover 76 and the rearward most end 122 abuts the bumper fascia 62 through a rear opening 132 in the rearward most part 112. The forward most end 124 may also be recessed below a top opening 134 in the upper part 104 of the bumper reinforcement body 64. The mechanical extending component 118 is in the recessed configuration with the vehicle 10 under normal operating conditions. With the mechanical extending component 118 in the retracted configuration, no indication of a low-energy impact is provided by the low-energy impact indicator 100.

Figure 4:
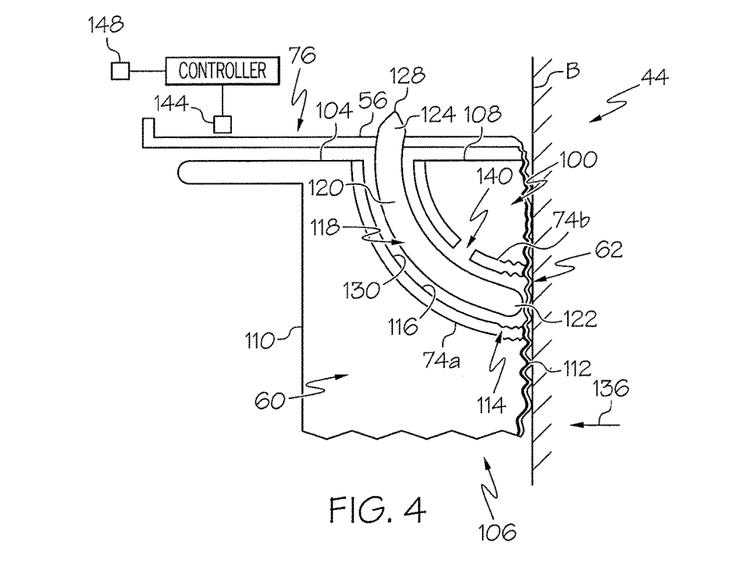
FIG. 4 depicts the vehicle rear bumper assembly of FIG. 3 with the low-energy impact indicator moved from a retracted configuration to an extended configuration, according to one or more embodiments shown and described herein.

FIG. 4 illustrates the mechanical extending component 118 in an extended configuration, positioning the forward most end 124 above the bumper cover 76 in a low-energy impact indicated position. As can be seen by FIG. 4, as an impact barrier B engages the bumper fascia 62, the bumper fascia 62 (or outer bumper reinforcement cover 78) is moved forward in the direction of arrow 136. As the vehicle rear bumper assembly 44 moves rearward (or the impact barrier moves forward), the rearward most end 122 is also moved forward. If the speed in which the vehicle rear bumper assembly 44 impacts the impact barrier B is above a predetermined threshold (e.g., at least about 1.5 mph, such as at least about 2.5 mph, such as at least about 5 mph), the mechanical extending component 118 moves from the retracted configuration of FIG. 3 to the extended configuration of FIG. 4.

To move the mechanical extending component 118 to the extended configuration, the impact barrier B continues to move into the bumper beam reinforcement member 60, pushing on the rearward most part 112 and the rearward most end 122 of the mechanical extending component 118. In some embodiments, to facilitate extension of the mechanical extending component 118, the guide web 74b is forced to fracture at a location 140. In some embodiments, the guide web 74b may have a region of weakness (e.g., a region of reduced thickness, a score line, etc.) at the location 140 such that the guide web 74b fractures in a predictable fashion under the predetermined conditions. In some embodiments, the rupturing of the guide web 74 allows the radius of curvature of the guide web 74a to decrease, which can further aid the mechanical extending component 118 to extend.

Further movement of the impact barrier B into the bumper beam reinforcement member 60 causes the forward most end 124 to engage the bumper cover 76. As noted above, the bumper cover 76 may be part of the bumper fascia 62 or the bumper cover 76 may be a separate component. The size and shape of the forward most end 124 and the material of the component body 120 are selected such that the forward most end 124 pierces through the bumper cover 76 under the predetermined low-energy impact conditions. In some embodiments, the bumper cover 76 may have a region of weakness at the location where the forward most end 124 of the mechanical extending component engages the bumper cover 76. Once the impact barrier B is removed from the bumper beam reinforcement member 60, the forward most end 124 of the mechanical extending component 118 remains visible outside the bumper cover 76. In some embodiments, the forward most end 124 may have a hooklike feature that inhibits retraction of the mechanical extending component 118 into the guide channel 114 once the forward most end 124 extends through the bumper cover 76.

Figure 5:
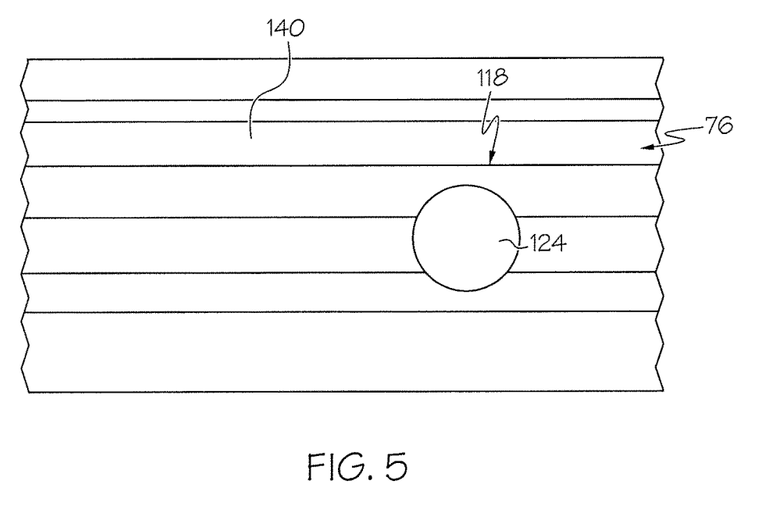
FIG. 5 illustrates a top view of a mechanical extending component of the low-energy impact indicator of FIG. 4 extending through a bumper cover of the vehicle rear bumper assembly of FIG. 2, according to one or more embodiments shown and described herein.

Referring to FIG. 5, as an example, the forward most end 124 of the mechanical extending component 118 is illustrated in the extended configuration. In the extended configuration, the forward most end 124 is visible from outside the vehicle rear bumper assembly 44 with penetration through the bumper cover 76. In some embodiments, the forward most end 124 may be provided a color that is different from the bumper cover 76, such that the presence of the forward most end 124 is highlighted relative to the bumper cover 76. In the illustrated example, the forward most end 124 also penetrates through one or more anti-slip ridges 142 of increased thickness that are provided by the bumper cover 76.

Referring again to FIGS. 3 and 4, in some embodiments, the vehicle rear bumper assembly 44 may include a detector 144, such as a proximity sensor that is used to detect movement of the mechanical extending component 118. In some embodiments, the detector 144 may be located outside the vehicle rear bumper assembly 44, as shown, to detect the forward most end 124 of the mechanical extending component 118 only when the forward most end 124 penetrates the bumper cover 76. In other embodiments, the detector 144 may be located within the vehicle rear bumper assembly 44 to detect movement of the mechanical extending component 118 within the vehicle rear bumper assembly 44. The detector 144 may be connected to a controller 146 (e.g., a vehicle ECU), which may receive a signal from the detector 144 upon detection of movement of the mechanical extending component 118. The detector 144 may, in turn, control operation of an indicator 148 (e.g., an indicator light) that may be illuminated on an instrument panel of the vehicle 10, which can indicate that the vehicle rear bumper assembly 44 may need servicing.

Figure 6:
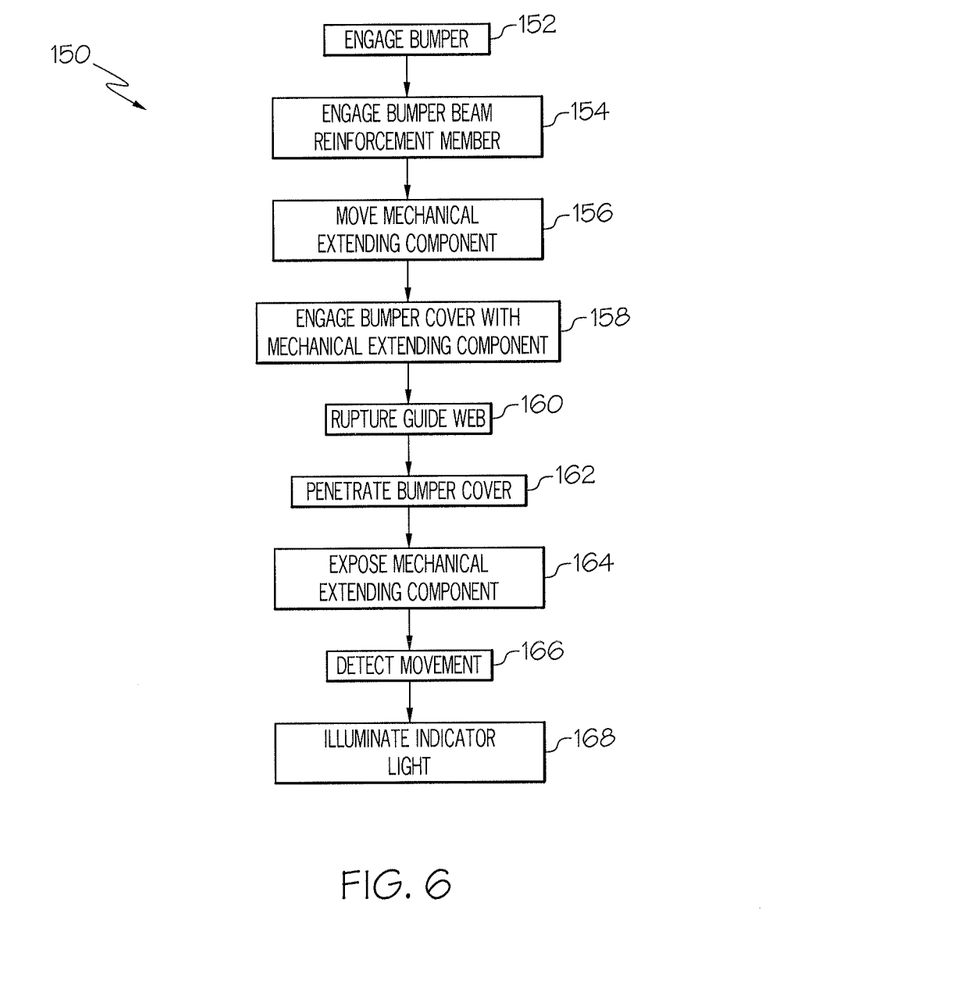
FIG. 6 illustrates a method of providing an indication to a vehicle user that the vehicle rear bumper assembly has experienced a low-energy impact above a predetermined threshold using the low-energy impact indicator of FIG. 3, according to one or more embodiments shown and described herein.

Referring to FIG. 6, a method 150 of providing an indication to a vehicle user that the vehicle rear bumper assembly has experienced a low-energy rear impact is provided. At step 152, the impact barrier B engages the bumper fascia 62 of the vehicle rear bumper assembly 44 at a relatively low rate of speed (e.g., no more than about 5 mph). This impact may occur during a rear impact test or when the vehicle 10 is in reverse, as examples. Due to this engagement, the bumper fascia 62 is deflected forward in the vehicle longitudinal direction until the impact barrier B engages the rearward most part 112 of the bumper beam reinforcement member 60 at step 154. Continued movement of the impact barrier B into the bumper beam reinforcement member 60 causes movement of the mechanical extending component 118 within the guide channel 114 at step 156. At step 158, due to the shape of the guide channel 114 and the mechanical extending component 118, the mechanical extending component 118 and the forward most end 124 moves toward the bumper cover 76. At step 160, the guide web 74b ruptures thereby facilitating movement of the mechanical extending component 118 within the guide channel 114. With engagement of the forward most end 124 of the mechanical extending component 118 and the bumper cover 76, the forward most end 124 penetrates through the bumper cover 76 at step 162. At step 164, the forward most end 124 of the mechanical extending component 118 becomes exposed above the bumper cover 76 thereby indicating a low-energy impact to the vehicle rear bumper assembly 44 has occurred of sufficient magnitude to actuate the low-energy impact indicator 100. In some embodiments, the detector 144 may detect movement of the mechanical extending component 118 at step 166. At step 168, the indicator light 148 may be illuminated, which can provide the vehicle operator an indication that the vehicle rear bumper assembly 44 has experienced a low-energy impact event.

The above-described low-energy impact indicators can provide a vehicle operator with an indication that the vehicle rear bumper assembly has experienced a low-energy impact event. In some instances, such a low impact energy event may affect the structural integrity of the bumper beam reinforcement member, such as the ability to resist vertical forces due to loads placed on the vehicle rear bumper assembly. The presence of the forward most end above the bumper cover can provide a signal to the vehicle operator to have the vehicle rear bumper assembly serviced, even though little, if any, visible damage to the vehicle bumper assembly is present. While a single low-energy impact indicator is described above, there may be multiple low-energy impact indicators located along the vehicle lateral direction of the vehicle rear bumper assembly. For example, each low-energy impact indicators may be located in both side portions of the vehicle rear bumper assembly. Such an arrangement may allow for detection of a variety of low-energy impact events from a variety of impact directions. In some embodiments, the multiple low energy impact indicators may be tuned to extend upon an occurrence of a low-energy impact event of differing magnitudes.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A vehicle comprising:
 a vehicle body having a front and a rear;
 a vehicle rear bumper assembly located at the rear of the vehicle body, the vehicle rear bumper assembly comprising:
  a bumper beam reinforcement member having an upper part, a lower part and a rearward most part extending between the upper part and the lower part;
  a bumper cover extending over the upper part; and
  a mechanical extending component located in the bumper reinforcement member, the mechanical extending component having a retracted configuration located below the bumper cover and an extended configuration where the mechanical extending component pierces through the bumper cover forming a hole therethrough in response to a low-energy impact to the rearward most part of the bumper beam reinforcement member.
2. The vehicle of claim 1, wherein the mechanical extending component penetrates through the bumper cover only in response to the low-energy impact to the rearward most part of the bumper beam reinforcement member of above a predetermined threshold.

3. The vehicle of claim 1, wherein the bumper beam reinforcement member comprises a guide web that provides a guide track along which the mechanical extending component travels.

4. The vehicle of claim 3, wherein the guide web is arcuate in shape providing the guide track extending from the rearward most part to the upper part of the bumper beam reinforcement member.

5. The vehicle of claim 4, wherein the mechanical extending component is arcuate in shape.

6. The vehicle of claim 1 further comprising a bumper fascia that covers the rearward most part of the bumper beam reinforcement member.

7. The vehicle of claim 6, wherein the mechanical extending component includes a rearward most end located nearer the bumper fascia and a forward most end located nearer the bumper cover.

8. The vehicle of claim 1, wherein the bumper beam reinforcement member is a unitary molded plastic bumper beam reinforcement member.

9. A vehicle rear bumper assembly comprising:
a bumper beam reinforcement member having an upper part, a lower part and a rearward most part extending between the upper part and the lower part;
a bumper cover extending over the upper part; and
a mechanical extending component located in the bumper reinforcement member, the mechanical extending component having a retracted configuration located below the bumper cover and an extended configuration where the mechanical extending component penetrates through the bumper cover in response to a low-energy impact to the rearward most part of the bumper beam reinforcement member;
wherein the bumper beam reinforcement member comprises a guide web that provides a guide track along which the mechanical extending component travels.

10. The vehicle rear bumper assembly of claim 9, wherein the mechanical extending component penetrates through the bumper cover only in response to the low-energy impact to the rearward most part of the bumper beam reinforcement member of above a predetermined threshold.

11. The vehicle rear bumper assembly of claim 10, wherein the guide web is arcuate in shape providing the guide track extending from the rearward most part to the upper part of the bumper beam reinforcement member.

12. The vehicle rear bumper assembly of claim 11, wherein the mechanical extending component is arcuate in shape.

13. The vehicle rear bumper assembly of claim 9 further comprising a bumper fascia that covers the rearward most part of the bumper beam reinforcement member.

14. The vehicle rear bumper assembly of claim 13, wherein the mechanical extending component includes a rearward most end located nearer the bumper fascia and a forward most end located nearer the bumper cover.

15. The vehicle rear bumper assembly of claim 9, wherein the bumper beam reinforcement member is a unitary molded plastic bumper beam reinforcement member.

16. A method of providing an indication to a vehicle user that a vehicle rear bumper assembly has experienced a low-energy rear impact, the method comprising:
engaging an impact barrier with a vehicle rear bumper assembly, the vehicle rear bumper assembly comprising:
a bumper beam reinforcement member having an upper part, a lower part and a rearward most part extending between the upper part and the lower part;
a bumper cover extending over the upper part; and
a mechanical extending component located in the bumper reinforcement member, the mechanical extending component having a retracted configuration located below the bumper cover;
moving the mechanical extending component to an extended configuration in response to a low-energy impact during the step of engaging the impact barrier, the mechanical extending component piercing through the bumper cover forming a hole therethrough as the mechanical extending component moves to the extended configuration.

17. The method of claim 16, wherein the bumper beam reinforcement member is a unitary molded plastic bumper beam reinforcement member.

18. The method of claim 16, wherein the mechanical extending component penetrates through the bumper cover only in response to the low-energy impact of above a predetermined threshold.

19. The method of claim 16, wherein the bumper beam reinforcement member comprises a guide web that provides a guide track along which the mechanical extending component travels.

20. The vehicle rear bumper assembly of claim 9, wherein the mechanical extending component pierces through the bumper cover forming a hole therethrough in response to a low-energy impact to the rearward most part of the bumper beam reinforcement member.

* * * * *